United States Patent
VanDerKamp et al.

(10) Patent No.: US 10,565,882 B1
(45) Date of Patent: Feb. 18, 2020

(54) VERTICAL SITUATION DISPLAY PAST AND PROJECTED PATH DEPICTION

(71) Applicant: Rockwell Collins, Inc., Cedar Rapids, IA (US)

(72) Inventors: Travis S. VanDerKamp, Marion, IA (US); Jon E. Kirtz, Center Point, IA (US); Joseph D. Forrest, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 126 days.

(21) Appl. No.: 15/703,545

(22) Filed: Sep. 13, 2017

(51) Int. Cl.
G01S 19/15 (2010.01)
G08G 5/00 (2006.01)
G01C 23/00 (2006.01)
G01S 13/91 (2006.01)

(52) U.S. Cl.
CPC ......... G08G 5/0021 (2013.01); G01C 23/005 (2013.01); G01S 13/913 (2013.01); G01S 19/15 (2013.01); G08G 5/0078 (2013.01)

(58) Field of Classification Search
CPC .. G08G 5/0021; G08G 5/0078; G01S 13/913; G01S 19/15; G01C 23/005
See application file for complete search history.

(56) References Cited

U.S. PATENT DOCUMENTS 9,146,133 B2 * 9/2015 Pepitone ................. G01C 23/00
9,583,010 B1 * 2/2017 Kolek .................... G08G 5/0065
2012/0310524 A1 * 12/2012 Pepitone ................. G01C 23/00
  701/411
2017/0047983 A1 * 2/2017 Gouillou ............ H04B 7/18506
2018/0336743 A1 * 11/2018 Lonski .................. G01S 5/0018

OTHER PUBLICATIONS

Williams et al., Effects of integrated flight path and terrain displays on controlled flight into terrain, 1993, IEEE, p. 709-714 (Year: 1993).*
Bone et al., Paired approach operational concept, 2001, IEEE, p. 1-14 (Year: 2001).*
Battiste et al., Airborne and ground information for lateral spacing during closely spaced parallel approach operations, 2002, IEEE, p. 1-12 (Year: 2002).*
Atkings et al., Relative Position Indicator for merging mixed RNAV and vectored arrival traffic, 2011, IEEE, p. 1-13 (Year: 2011).*

* cited by examiner

*Primary Examiner* — McDieunel Marc
(74) *Attorney, Agent, or Firm* — Donna P. Suchy; Daniel M. Barbieri (57) ABSTRACT

An aircraft path vector analysis system includes at least one processor coupled with a non-transitory processor-readable medium storing processor-executable code for causing the at least one processor to determine a previous path of an aircraft, determine an approach volume based on a location of a runway and a location of the aircraft, determine a projected path vector of the aircraft based on at least one of the previous path of the aircraft and an aircraft performance characteristic, and display data indicative of at least one of the previous path, the projected path vector, and the approach volume on a display device, where the projected path vector indicates whether the aircraft is projected to remain in the approach volume.

20 Claims, 4 Drawing Sheets

VERTICAL SITUATION DISPLAY PAST AND PROJECTED PATH DEPICTION

BACKGROUND

The inventive concepts disclosed herein relate generally to the field of situational awareness displays. More particularly, embodiments of the inventive concepts disclosed herein relate to assisting an aircraft control system or aircraft operator to determine a future path of the aircraft using a previous path and approach volume.

A Vertical Situation Display ("VSD") does an excellent job of providing awareness of an aircraft's present position and height relative to an external object or hazard, such as a runway surface and approaching terrain. However, to maintain awareness of the aircraft's movement with respect to an external object or hazard requires continuous monitoring of a VSD since a VSD, like a typical display system, displays the position of the aircraft at only one point in time. For example, it is difficult for aircraft operators to quickly visualize the movement of the aircraft relative to a runway surface by simply viewing a VSD displaying an approach of the aircraft. As such, aircraft operators are often unsure whether their aircraft is coming in too steep or too flat, or too fast or too slow when landing, or whether they are going to safely clear other terrain while inflight.

SUMMARY

In one aspect, the inventive concepts disclosed herein are directed to an aircraft path vector analysis system. The system includes at least one processor coupled with a non-transitory processor-readable medium storing processor-executable code. The processor-executable code is for causing the at least one processor to determine a previous path of an aircraft, determine an approach volume based on a location of a runway and a location of the aircraft, and determine a projected path vector of the aircraft based on at least one of the previous path of the aircraft and an aircraft performance characteristic. The processor-executable code is also for causing the at least one processor to display data indicative of at least one of the previous path, the projected path vector, and the approach volume on a display device. The projected path vector indicates whether the aircraft is projected to remain in the approach volume.

In a further aspect, the inventive concepts disclosed herein are directed to method. The method includes determining a previous path of an aircraft; determining an approach volume based on a location of a runway and a location of the aircraft; determining a projected path vector of the aircraft based on at least one of the previous path of the aircraft and an aircraft performance characteristic; and displaying data indicative of at least one of the previous path, the projected path vector, and the approach volume on a display device. The projected path vector indicates whether the aircraft is projected to remain in the approach volume.

In a further aspect, the inventive concepts disclosed herein are directed to a system. The system includes a previous path circuit configured to generate a previous path of an aircraft, a navigation volume circuit configured to generate a navigation volume, and a projected path circuit configured to generate a projected path vector of the aircraft based on the previous path of the aircraft. The generated previous path, the generated navigation volume, and the generated projected path vector are configured to be displayed on a display device.

BRIEF DESCRIPTION OF THE DRAWINGS

Implementations of the inventive concepts disclosed herein may be better understood when consideration is given to the following detailed description thereof. Such description makes reference to the included drawings, which are not necessary to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to vertical situation display including past and projected path depictions. The inventive concepts disclosed herein can be utilized in a number of control and alerting systems for various types of applications, sensing systems, and display systems. While the present disclosure describes systems and methods implementable for a Vertical Situational Display ("VSD") of an aircraft, the inventive concepts disclosed herein may be used in any type of environment (e.g., in another aircraft, a spacecraft, a ground-based vehicle, or in a non-vehicle application such as a ground-based display system, an air traffic control system, a radar system, a virtual display system). While certain examples and embodiments of the inventive concepts disclosed herein are described with respect to a pilot of an aircraft, it will be appreciated that users other than a pilot may use and benefit from the inventive concepts disclosed herein with respect to other vehicles or and objects.

Figure 1:
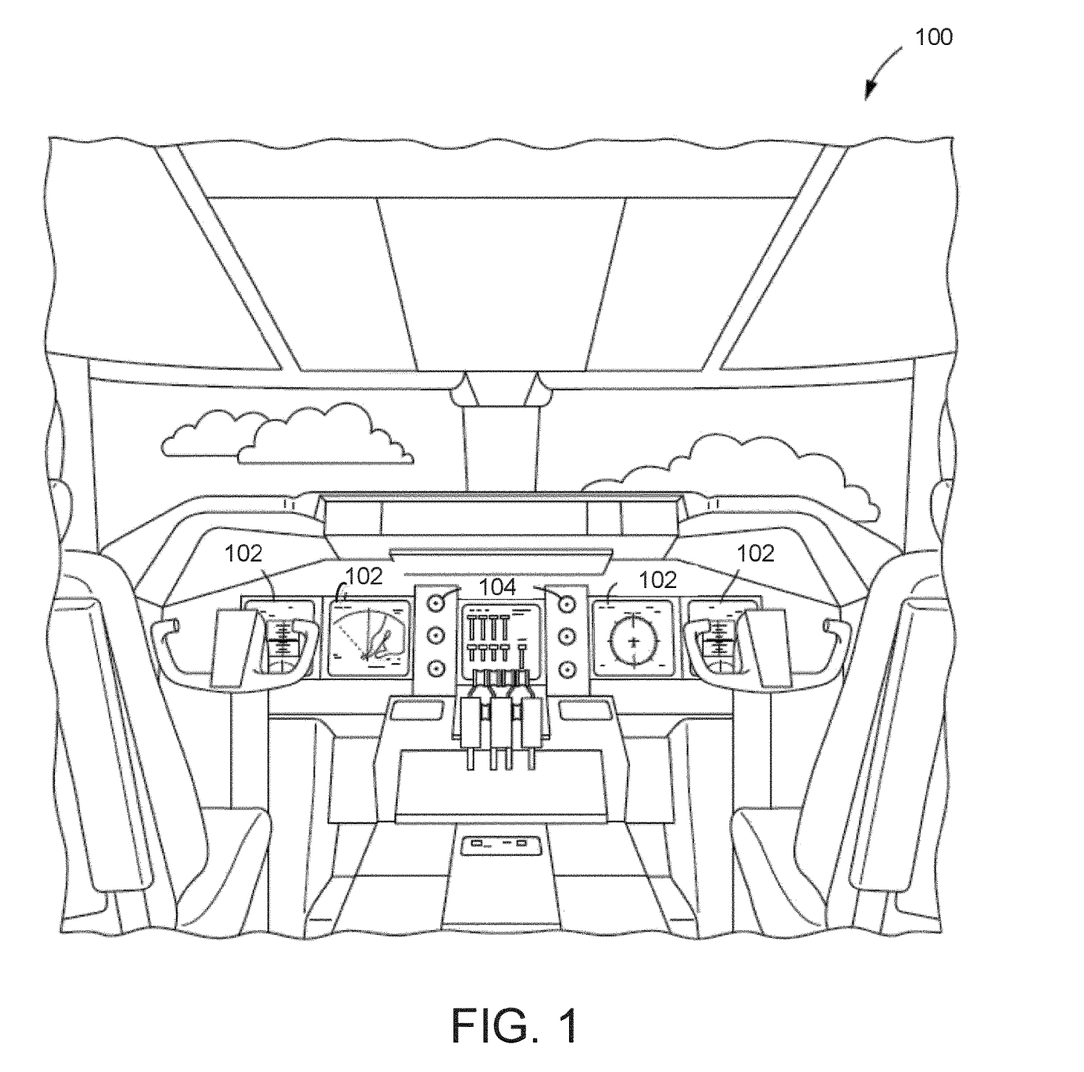
FIG. 1 is a schematic illustration of an exemplary embodiment of a control center of an aircraft according to the inventive concepts disclosed herein.

Referring now to FIG. 1, a schematic illustration of an exemplary embodiment of a control center of an aircraft is shown according to the inventive concepts disclosed herein. The aircraft control center 100 (or "cockpit") includes one or more flight displays 102 and one or more user interface (UI) elements 104. The flight displays 102 may be implemented using any of a variety of display technologies, including CRT, LCD, organic LED, dot matrix display, and others. The flight displays 102 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass® and so on. The flight displays 102 may be used to provide information to the flight crew, thereby increasing the flight crew's visual range and enhancing their decision-making abilities. The flight displays 102 may be configured to function as, for example, a primary flight display (PFD) used to display altitude, airspeed, vertical speed, navigation and traffic collision avoidance system (TCAS) advisories; a crew alert system (CAS) configured to provide alerts to the flight crew; a multi-function display used to display navigation maps, weather radar, electronic charts, TCAS traffic, aircraft maintenance data and electronic checklists, manuals, and procedures; an engine indicating and crew-alerting system (EICAS) display used to display critical engine and system status data, and so on. Other types and functions of the flight displays 102 are contemplated and will be apparent to those skilled in the art. According to various exemplary embodiments of the inventive concepts disclosed herein, at least one of the flight displays 102 may be configured to provide a rendered display from the systems and methods described herein.

In some embodiments, the flight displays 102 provide an output from an aircraft-based system, a ground-based system, a satellite-based system, or from a system of another aircraft. In some embodiments, the flight displays 102 provide an output from an aircraft-based weather radar system, LIDAR system, infrared system or other system on the aircraft. For example, the flight displays 102 may include an avionics display, a joint display, an air traffic display, a weather radar map, and a terrain display. The flight displays 102 include an electronic display or a synthetic vision system (SVS). For example, the flight displays 102 may include a display configured to display a two-dimensional (2-D) image, a three-dimensional (3-D) perspective image, or a four-dimensional (4-D) display. Other views of air traffic information, terrain, and/or weather information may also be provided (e.g., plan view, horizontal view, and vertical view). The views shown on the flight displays 102 may include monochrome or color graphical representations of the displayed information. Graphical representations of the displayed information may include an indication of altitude of other aircraft, weather conditions, or terrain, or the altitude and/or location of such information relative to the aircraft.

The UI elements 104 may include, for example, dials, switches, buttons, touch screens, keyboards, a mouse, joysticks, cursor control devices (CCDs) or other multi-function key pads certified for use with avionics systems. The UI elements 104 may be configured to, for example, allow an aircraft crew member to interact with various avionics applications and perform functions such as data entry, manipulation of navigational maps, and moving among and selecting checklist items. For example, the UI elements 104 may be used to adjust features of the flight displays 102, such as contrast, brightness, width, and length. The UI elements 104 may also (or alternatively) be used by an aircraft crew member to interface with or manipulate the displays of the flight displays 102. For example, the UI elements 104 may be used by aircraft crew member to adjust the brightness, contrast, and information displayed on the flight displays 102. The UI elements 104 may additionally be used to acknowledge or dismiss an indicator provided by the flight displays 102. Further, the UI elements 104 may be used to correct errors on the flight displays 102. Other UI elements 104, such as indicator lights, displays, display elements, and audio alerting devices, may be configured to warn of potentially threatening conditions such as severe weather, terrain, and obstacles.

Figure 2:
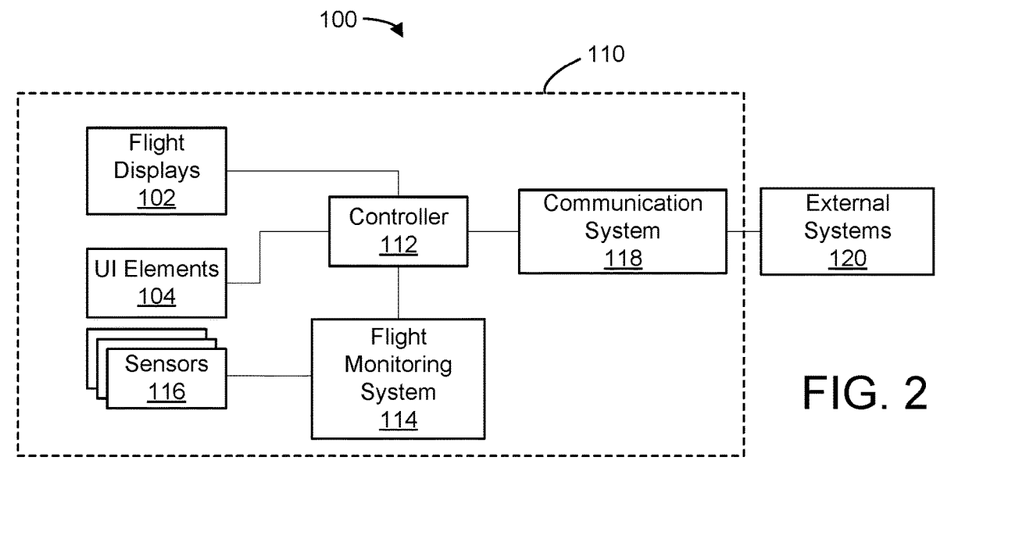
FIG. 2 is block diagram of an aircraft situational awareness system including a controller according to the inventive concepts disclosed herein.

Referring now to FIG. 2, a block diagram of an aircraft situational awareness system 110 including a controller 112 is shown according to the inventive concepts disclosed herein. The aircraft situational awareness system 110 includes a controller 112, the flight displays 102, the UI elements 104, a flight monitoring system 114, a plurality of sensors 116, and a communication system 118. The aircraft situational awareness system 110 can include other systems and components for general aircraft operation, such as a weather radar system.

The controller 112 is configured to send data to and receive data from, or otherwise facilitate electronic data communications, with the other systems of the aircraft situational awareness system 110 or with remote systems such as satellite-based systems or ground-based systems. The controller 112 can interface with an aircraft control system, aircraft monitoring system, or other such system. The controller 112 can be configured to generally receive input from the various other systems and generate past and projected path depictions and an approach volume of an aircraft based on the input. The structure of the controller 112 is shown in greater detail in FIG. 3 and the activities of the controller 112 are explained in greater detail with respect to FIG. 3. In various embodiments, the controller 112 can be configured to perform any of the actions described herein using any of the various other systems of the aircraft situational awareness system 110 as described herein.

The plurality of sensors 116 may include, for example, one or more fuel sensors, airspeed sensors, location tracking sensors (e.g., GPS), lightning sensors, turbulence sensors, pressure sensors, optical systems (e.g., camera system, infrared system), weather sensors, such as outside air temperature sensors, winds at altitude sensors, INS G load (in-situ turbulence) sensors, barometric pressure sensors, humidity sensors, or any other aircraft sensors or sensing system that may be used to monitor the performance of an aircraft or weather local to or remote from the aircraft. The plurality of sensors 116 may include one or more sensors configured to acquire air data indicative of at least one air characteristic (e.g., a pressure, an indicated airspeed, a true airspeed, an angle of attack, a pitch angle, an altitude, a temperature) of an environment surrounding the aircraft 106. The sensors may be located in various positions on the aircraft 106, and a single sensor may be configured to acquire more than one type of sensor data. Data from the sensors 116 is output to the controller 112 for further processing and display as described below.

The flight monitoring system 114 may be or include at least one of a GPS, a Global Navigation Satellite System (GNSS), an altitude heading and reference system (AHRS), and an inertial reference system (IRS). The flight monitoring system 114 is configured to acquire flight data indicative of at least one flight characteristic of the aircraft 106. The flight characteristics may include, for example, a ground speed, a vertical speed, a pitch angle, or an altitude of the aircraft 106. Data from the flight monitoring system 114 is output to the controller 112 for determining an impact of the flight characteristics on the aircraft 106 during a flight event (e.g., landing or landing approach, takeoff).

The communication system 118 facilitates communications between the controller 112 and an external system 120 (e.g., a satellite system, other aircraft, a terrestrial station, or other air, space, or ground-based system). For example, the communication system 118 can send data to and receive data from external ground-based weather supplier systems and ground-based air traffic control systems. The communication system 118 can communicate with the external system 120 using any type of communication protocol or network (e.g., via a mobile network, via one or more bi-directional or uni-directional communication channels) and can include any type of wired or wireless interface for facilitating the communication. It should be understood that the information received by the controller 112 as described in the present disclosure can come from any internal or external source.

Figure 3:
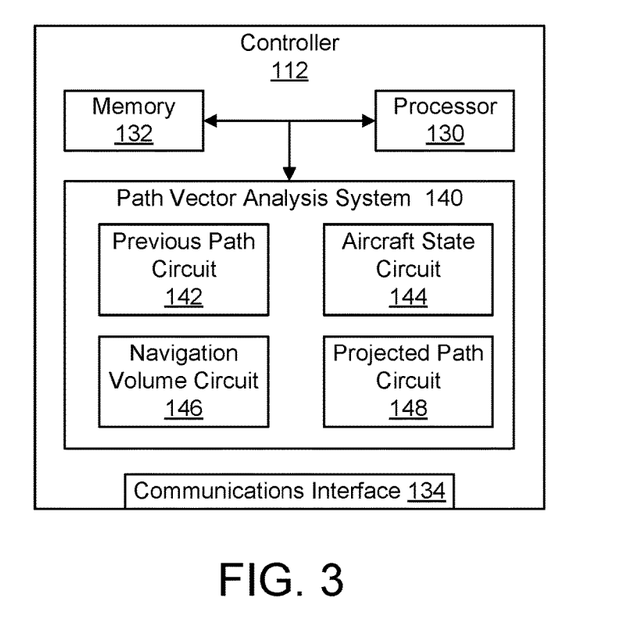
FIG. 3 is a block diagram of the controller of the aircraft situational awareness system of FIG. 2.

Referring now to FIG. 3, a block diagram of the controller 112 of the aircraft situational awareness system 110 of FIG. 2 is shown according to the inventive concepts disclosed herein. The controller 112 includes a processor 130, a memory 132, a communications interface 134, and a path vector analysis system 140. The communications interface 134 is configured to facilitate communications between the controller 112 and the other components and systems of the situational awareness system 110.

The processor 130 can be implemented as a general or specific purpose processor, an application specific integrated circuit (ASIC), one or more field programmable gate arrays (FPGAs), a group of processing components, or other suitable electronic processing components. The memory 132 is one or more devices (e.g., RAM, ROM, flash memory, hard disk storage) for storing data and computer code for completing and facilitating the various user or client processes, layers, and modules described in the present disclosure. The memory 132 can be or include volatile memory or non-volatile memory and can include database components, object code components, script components, or any other type of information structure for supporting the various activities and information structures of the inventive concepts disclosed herein. The memory 132 is communicably connected to the processor 130 and includes computer code or instruction modules for executing one or more processes described herein.

The memory 132 includes one or more memory devices for storing instructions that are executable by the processor 130 to carry out the functions of the situational awareness system 110. The memory 132 (e.g., RAM, ROM, Flash Memory, hard disk storage, etc.) can store various data and/or computer code for facilitating the various processes described herein. The memory 132 can be communicably connected to the processor 130 to provide computer code or instructions to the processor 130 for executing at least some of the processes described herein. Moreover, the memory 132 can be or include tangible, non-transient volatile memory or non-volatile memory. Accordingly, the memory 132 can include database components, object code components, script components, or any other type of information structure for supporting the various activities and information structures described herein.

The path vector analysis system 140 includes a previous path circuit 142, an aircraft state circuit 144, an navigation volume circuit 146, and a projected path circuit 148. In some embodiments, the previous path circuit 142, the aircraft state circuit 144, the navigation volume circuit 146, and the projected path circuit 148 are embodied as machine or computer-readable media that is executable by a processor, such as processor 130. As described herein and amongst other uses, the machine-readable media facilitates performance of certain operations to enable generation of past and projected path depictions and an approach volume of an aircraft. For example, the machine-readable media can provide an instruction (e.g., command, etc.) to acquire data. In this regard, the machine-readable media can include programmable logic that defines the frequency of acquisition of the data (or, transmission of the data). The computer readable media can include code, which can be written in any programming language including, but not limited to, Java or the like and any conventional procedural programming languages, such as the "C" programming language or similar programming languages. The computer readable program code can be executed on one processor or multiple remote processors. In the latter scenario, the remote processors can be connected to each other through any type of network (e.g., CAN bus, etc.).

In another configuration, the previous path circuit 142, the aircraft state circuit 144, the navigation volume circuit 146, and the projected path circuit 148 are embodied as hardware units, such as electronic control units. As such, the previous path circuit 142, the aircraft state circuit 144, the navigation volume circuit 146, and the projected path circuit 148 can be embodied as one or more circuitry components including, but not limited to, processing circuitry, network interfaces, peripheral devices, input devices, output devices, sensors, etc. In some embodiments, the previous path circuit 142, the aircraft state circuit 144, the navigation volume circuit 146, and the projected path circuit 148 can take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the previous path circuit 142, the aircraft state circuit 144, the navigation volume circuit 146, and the projected path circuit 148 can include any type of component for accomplishing or facilitating achievement of the operations described herein. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on). The previous path circuit 142, the aircraft state circuit 144, the navigation volume circuit 146, and the projected path circuit 148 can also include programmable hardware devices such as field programmable gate arrays, programmable array logic, programmable logic devices or the like. The previous path circuit 142, the aircraft state circuit 144, the navigation volume circuit 146, and the projected path circuit 148 can include one or more memory devices for storing instructions that are executable by the processor(s) of the previous path circuit 142, the aircraft state circuit 144, the navigation volume circuit 146, and the projected path circuit 148. The one or more memory devices and processor(s) can have the same definition as provided herein with respect to the memory 132 and the processor 130. In some hardware unit configurations, the previous path circuit 142, the aircraft state circuit 144, the navigation volume circuit 146, and the projected path circuit 148 can be physically located in separate locations in the situational awareness system 110. Alternatively, and as shown, the previous path circuit 142, the aircraft state circuit 144, the navigation volume circuit 146, and the projected path circuit 148 can be embodied in or within a single unit/housing, which is shown as the path vector analysis system 140 of the controller 112. In some embodiments, the previous path circuit 142, the aircraft state circuit 144, the navigation volume circuit 146, and the projected path circuit 148 can be a hybrid of any device disclosed above, such as a specific purpose processor or task execution unit (e.g., configured to execute a micro node) with additional circuitry specifically configured to execute bandwidth calculations, frame analysis, or routing determinations.

The previous path circuit 142 is configured to determine a previous path of the aircraft 110. The previous path can indicate a trend (e.g., a downward-curving trend, increase of descent rate, a steady flat path) of the aircraft or used to understand movement and an energy state of the aircraft (e.g., for determining the projected path of the aircraft 110). The previous path can be based on aircraft position points and GSP data points.

The aircraft state circuit 144 is configured to determine a state of the aircraft and an environment of the aircraft. The aircraft state circuit 144 can determine a weather condition such as wind, temperature, and pressure. The aircraft state circuit 144 can determine a characteristic of the aircraft, such as a performance characteristic. The performance characteristic can include an airspeed, velocity, decent rate, pitch, and location, among other aircraft performance characteristics.

The navigation volume circuit 146 is configured to determine a navigation volume indicating an area for the aircraft to navigate within. The navigation volume can be an approach volume based on a location of a runway and a location of the aircraft. For example, the approach volume can indicate where in the environment the aircraft should be during an approach to a runway as the aircraft descends below a threshold altitude. In some embodiments, the navigation volume circuit 146 can determine location volumes for the aircraft with respect to other events other than landing, such as navigating hazards, such as a terrain hazard (e.g., a mountain or other terrain) or a traffic hazard (e.g., other aircraft). The navigation volume can also indicate how closely the aircraft is tracking a planned route and whether the aircraft has deviated a threshold distance off of the planned route. In some embodiments, the navigation volume can indicate how the aircraft can navigate to avoid a weather event (e.g., a thunderstorm).

For example, the navigation volume can be depicted in front of the aircraft and a projected path vector can be shown extending from the aircraft and either being contained within the navigation volume or crossing beyond the navigation volume. As such, the navigation volume includes boundaries, such as an upper boundary and a lower boundary in the case of a two-dimensional display.

In some embodiments, the navigation volume may be based on government regulations or on a characteristic of the aircraft. For example, an approach volume can be a certain shape based on an airport or government regulation (e.g., indicating a steep landing approach is required). In another example, the approach volume can be based on aircraft performance, such as a current velocity and descent rate of the aircraft. In some embodiments, the navigation volume can provide additional information, such as how much runway is available to brake or how much braking distance will be needed based on current aircraft parameters in the case of using an approach volume for a landing scenario.

In some embodiments, the navigation volume is dynamic. For example, the navigation volume can change based a trend of the aircraft. For example, an aircraft that is traveling too slowly during a landing scenario and therefore is descending too quickly, the approach volume can dynamically change to alter the descent profile that the aircraft should take to reach the runway.

The projected path circuit 148 is configured to determine a projected path vector of the aircraft based on the previous path of the aircraft and the aircraft state. The projected path circuit 148 can determine the projected path vector by extrapolating the previous path of the aircraft indicating the projected path of the aircraft should the aircraft maintain its current path. The projected path circuit 148 can determine the projected path vector based on aircraft performance, weather (e.g., wind), altitude, temperature, descent rate, and aircraft dynamics. The projected path vector can be a straight or curved line. The projected path vector can dynamically change with a change in environmental condition (e.g., increased shear wind) or aircraft performance parameter (e.g., increased airspeed).

The projected path vector can provide an indication to the operator of the aircraft of a condition. For example, the projected path vector can include one or more colors to provide awareness of the aircraft being in danger of leaving the approach volume (e.g., green, yellow, red). In some embodiments, the condition can be a state of the aircraft, such as a velocity, static velocity, and downward acceleration. For example, where the projected path vector includes an indication of a velocity of the aircraft, the indication can be a dashed line where the length of the dashes indicates the velocity. In another example, the dashed line of the projected path vector can indicate a distance traveled in a specific amount of time. In some embodiments, the dashes of the projected path vector can indicate excessive airspeed (e.g., dashes colored blue). In some embodiments, the projected path vector can provide TAWS warnings or preliminary TAWS warnings.

In some embodiments, the projected path vector can be displayed with symbology indicating an environmental condition or aircraft performance parameter. The projected path vector can be displayed along with numerical values to provide discrete information, such as airspeed or angle of attack. In some embodiments, the projected path vector can be displayed in relation to a planned route, and any deviations can be indicated.

Other circuits or components may be included in the memory 132 and the path vector analysis system 140, such as a display circuit configured to render a display on or provide display data to one or more of the flight displays 102. The displayed information can generally include any of the information and data used or generated by the path vector analysis system 140, such as the previous path of the aircraft 110, the approach volume, and the projected path vector. For example, the display can display the previous path, the projected path vector, and the approach volume on a display device, the projected path vector indicating whether the aircraft is projected to remain in the approach volume. The displayed information can include other information as well, such as weather information or information derived from communications with an external source. In some embodiments, the displayed information can be presented as an alert or be presented along with an alert, such as a tactile or audible alert. The display can be any type of display, such as a three dimensional display and a vertical situation display device. The display can depict the aircraft 110 in a fixed position on a display screen of the display device.

Figure 4:
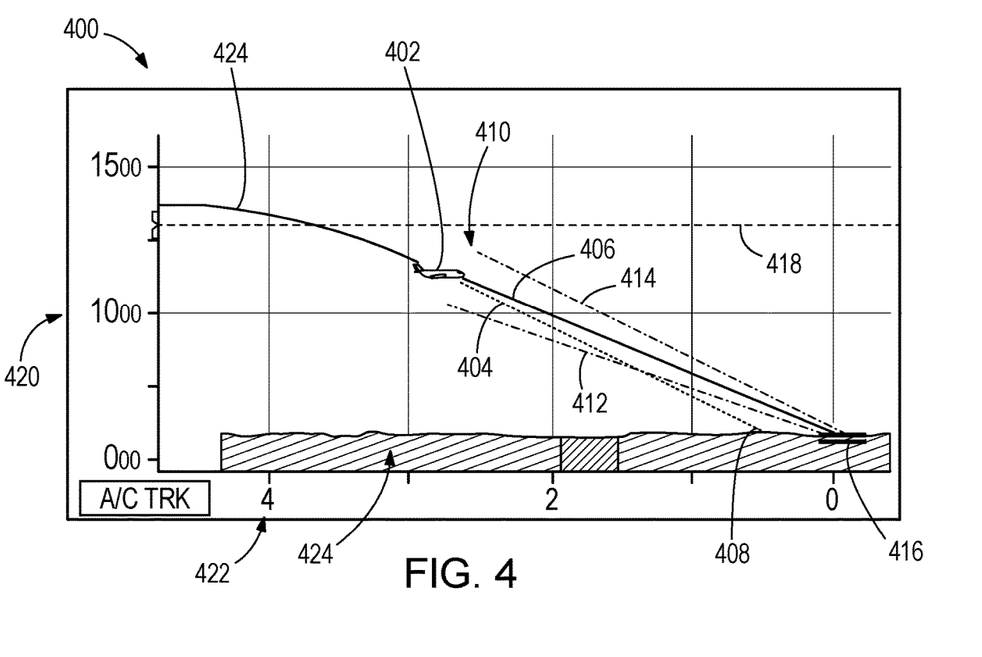
FIG. 4 is an illustration of an exemplary embodiment of vertical situational display depicting past and projected path vectors for a landing scenario according to the inventive concepts disclosed herein.

Referring now to FIG. 4, an illustration of an exemplary embodiment of vertical situational display 400 depicting past and projected path vectors for a landing scenario is shown according to the inventive concepts disclosed herein. As shown, the display 400 includes an x-axis 422 representing a lateral distance (e.g., a distance from the aircraft 402 to the destination runway 416), and a y-axis 420 representing an altitude. As shown, an altitude marker 418 can indicate a threshold altitude, such as at what altitude the aircraft 402 should enter a landing sequence, or an altitude at which the aircraft 402 is in danger of approaching or passing relatively closely to terrain. Unlike a typical VSD, the aircraft 402 is centered on the screen and the aircraft 402 moves in reference to the scene rather than the scene moving in reference to the aircraft 402.

The aircraft 402 is positioned to the right of the display screen to allow for display of a previous path 424 of the aircraft 402. The previous path 424 enables an aircraft operator to intuitively determine a current trend of the aircraft 402. For example, the previous path 424 can be used to understand movement and energy state of the aircraft 424. An expected approach volume 410 is depicted in front of the aircraft 402. A projected path vector 406 is shown extending from the aircraft 402 to the runway 416. The approach volume 410 includes an upper boundary 414 and a lower boundary 412.

In some embodiments, the projected path vector 406 is colored to provide awareness of when the aircraft 402 is in danger of leaving the safety of the approach volume 410. For example, an example projected path vector 404 is shown crossing the lower boundary 412 and terminating at a touchdown point 408 on ground terrain 424 well short of the runway 416. In this example, the example projected path vector 404 can be displayed as the color green when the aircraft 410 is well within the approach volume 410 or when the example projected path vector 404 interfaces with the runway 416, therefore indicating that the aircraft 402 is on a trajectory to reach the runway 416. In this example, the example projected path vector 404 can be displayed as the color yellow where or near where the aircraft 410 is projected to exit the approach volume 410 (e.g., by crossing either the upper boundary 414 or the lower boundary 412). In this example, the example projected path vector 404 can be displayed as the color red outside of the approach volume 410, indicating that a serious problem exists or will exist if the aircraft 402 continues to follow the example projected path vector 404.

In some embodiments, a more detailed indication of where the aircraft 402 is projected to touchdown on the runway can be provided. For example, the display can indicate that the aircraft 402 is projected to touchdown on the runway 1,000 feet down the runway and therefore may not have enough runway left to brake.

Figure 5:
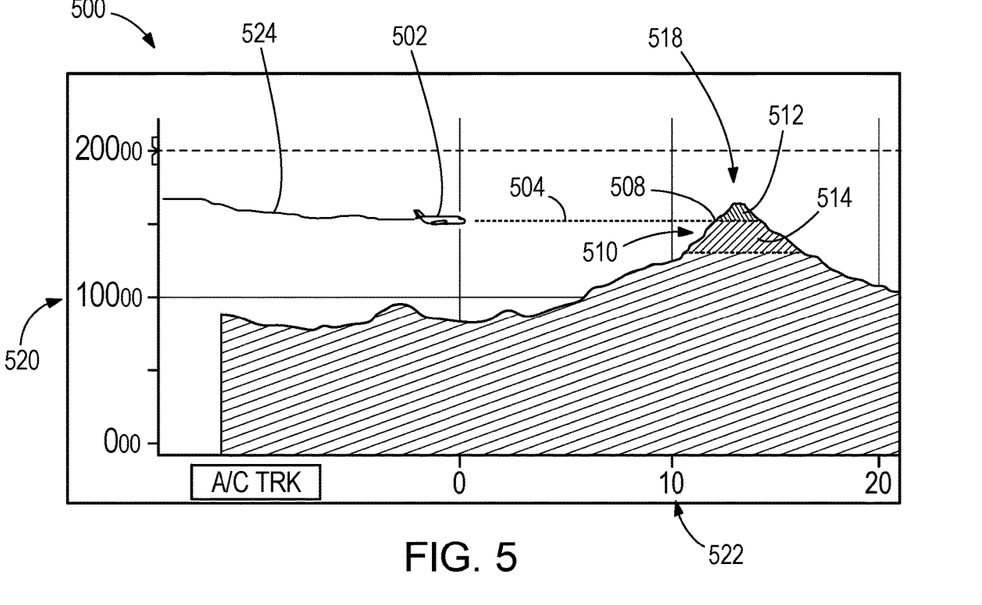
FIG. 5 is an illustration of an exemplary embodiment of vertical situational display depicting a hazard warning scenario according to the inventive concepts disclosed herein.

Referring now to FIG. 5, an illustration of an exemplary embodiment of vertical situational display 500 depicting a hazard warning scenario is shown according to the inventive concepts disclosed herein. As shown, the display 500 includes an x-axis 522 representing a lateral distance (e.g., a distance from the aircraft 502 to a hazard 518), and a y-axis 420 representing an altitude.

In this example, the display 500 provides additional awareness to an operator of the aircraft 402 prior to a terrain or obstacle TAWS event. A previous path 524 of the aircraft 502 is displayed to provide an intuitive indication of a current direction of the aircraft 502. The projected path 504 of the aircraft 502 is displayed in front of the aircraft 502 and can extend for a threshold distance (e.g., one mile, five miles, ten miles) or to a projected impact point 508 with the hazard 518. The projected path 504 can be displayed as the color green when the aircraft 502 is far enough away from the hazard 518 to not be at a present risk of a collision with the hazard 518. The projected path 504 can be displayed as the color yellow where a TAWS caution will be activated, such as when the aircraft is within a threshold distance to the hazard 518 or within a threshold time to impact with the hazard 518. The projected path 504 can be displayed as the color red where a TAWS warning will be active, such as when the aircraft is in immediate danger of impacting the hazard 518. In this way, the projected path 504 can provide a TAWS preliminary warning prior to getting a TAWS alert. In addition, alert volumes can be displayed for additional information.

In some embodiments, the hazard 518 may be depicted in color to illustrate portions of the hazard 518 that the aircraft 502 is most in danger of impacting. For example, an impact area 510 of the hazard 518 near the projected impact point 508 may be colored. In this example, a high probability impact area 512 is colored red to indicate that the aircraft 502 has a high likelihood of impacting the hazard 518 in this area, and a moderate probability impact area 514 is colored yellow to indicate that the aircraft 502 has a moderate likelihood of impacting the hazard 518 in this area.

Figure 6:
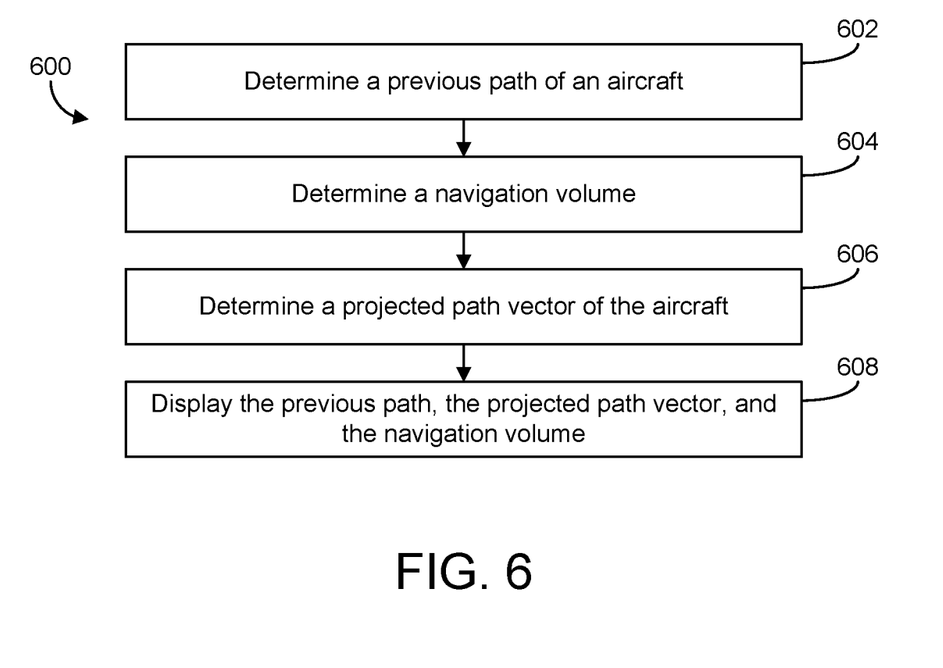
FIG. 6 is a diagram of an exemplary embodiment of a method of providing past and projected path vectors for an aircraft according to the inventive concepts disclosed herein.

Referring now to FIG. 6, an exemplary embodiment of a method according to the inventive concepts disclosed herein may include one or more of the following steps.

A step (602) may include determining a previous path of an aircraft. For example, the previous path can be based on aircraft position points and GSP data points.

A step (604) may include determining a navigation volume. The navigation volume can be an approach volume based on a location of a runway or a hazard volume indicating a volume the aircraft must navigate out of to safely clear a hazard, such as terrain, a weather event, or other aircraft.

A step (606) may include determining a projected path vector of the aircraft. The projected path vector can be based on extrapolating the previous path of the aircraft and additionally on an aircraft performance parameter. The projected path vector indicates a trend of the aircraft, and more specifically a future path that the aircraft will take unless the aircraft undergoes a change (e.g., due to an environmental condition or aircraft performance event, such as a loss of power or a pilot increasing power to the engines to increase aircraft speed).

A step (608) may include displaying the previous path, the projected path vector, and the navigation volume. The displayed information can include other information as well, such as weather information or information derived from communications with an external source. In some embodiments, the displayed information can be presented as an alert or be presented along with an alert, such as a tactile or audible alert.

As will be appreciated from the above, vertical situation displays including past and projected path depictions according to embodiments of the inventive concepts disclosed herein may help aircraft operators determine that they are on a safe approach or path, improve aircraft state awareness during critical phases of flight, enable quick determination of aircraft past and future path, provide additional awareness prior to a terrain or obstacle TAWS event, decrease pilot workload during critical stages of flight, enabling aircraft to flight tighter and safer routes, and overall improved situational awareness.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An aircraft path vector analysis system comprising:
at least one processor coupled with a non-transitory processor-readable medium storing processor-executable code for causing the at least one processor to:
determine a previous path of an aircraft;
determine and generate a digital approach volume based on a location of a runway and a location of the aircraft;
determine a projected path vector of the aircraft based on at least one of the previous path of the aircraft and an aircraft performance characteristic, the projected path vector indicating whether the aircraft is projected to remain in the approach volume; and
display data representing the digital approach volume and at least one of the previous path and the projected path vector on a display device.

2. The system of claim 1, wherein the projected path vector is displayed to overlay the approach volume, and wherein the approach volume is based on at least one of a government regulation, a characteristic of the aircraft, and the performance characteristic of the aircraft.

3. The system of claim 1, wherein the displayed data represents the previous path, the approach volume, and the projected path vector.

4. The system of claim 1, wherein the projected path vector comprises a color to provide awareness of the aircraft being in danger of leaving the approach volume.

5. The system of claim 1, wherein the projected path vector comprises an indication of a velocity of the aircraft, and wherein the indication comprises a dashed line where the length of the dashes indicate the velocity.

6. The system of claim 1, wherein the aircraft performance characteristic comprises at least one of a location, a speed, a velocity, a descent rate, or an ascent rate of the aircraft.

7. The system of claim 1, wherein the display is at least one of a three dimensional display and a vertical situation display device, and wherein the vertical situation display device is configured to display the aircraft to move with respect to a scene.

8. A method comprising:
determining, by a processor, a previous path of an aircraft;
determining and generating, by the processor, a digital approach volume based on a location of a runway and a location of the aircraft;
determining, by the processor, a projected path vector of the aircraft based on at least one of the previous path of the aircraft and an aircraft performance characteristic, the projected path vector indicating whether the aircraft is projected to remain in the approach volume; and
displaying data representing the approach volume and at least one of the previous path and the projected path vector on a display device.

9. The method of claim 8, wherein the projected path vector comprises a color to provide awareness of the aircraft being in danger of leaving the approach volume.

10. The method of claim 8, wherein the projected path vector comprises an indication of a velocity of the aircraft, and wherein the indication comprises a dashed line where the length of the dashes indicate the velocity.

11. The method of claim 8, wherein the aircraft performance characteristic comprises at least one of a location, a speed, a velocity, a descent rate, or an ascent rate of the aircraft.

12. The method of claim 8, wherein the projected path vector comprises a preliminary terrain awareness and warning system alert.

13. The method of claim 8, wherein the projected path vector crosses a boundary of the approach volume, and wherein the projected path vector comprises a first color within the approach volume and a second color beyond the boundary of the approach volume.

14. The method of claim 8, wherein the display device is a vertical situation display device, and wherein the vertical situation display device is configured to display the aircraft to move with respect to a scene.

15. A system comprising:
   a previous path circuit configured to generate a previous path of an aircraft;
   a navigation volume circuit configured to generate a digital navigation volume; and
   a projected path circuit configured to generate a projected path vector of the aircraft based on the previous path of the aircraft; and
   a display system configured to display the generated previous path, the generated navigation volume, and the generated projected path vector on a display device.

16. The system of claim 15, wherein the navigation volume is based on a location of a hazard and a location of the aircraft, the hazard comprising one of a terrain feature, a weather event, and another aircraft.

17. The system of claim 15, wherein the projected path vector comprises a preliminary terrain awareness and warning system alert.

18. The system of claim 15, wherein the projected path vector comprises a plurality of colors, wherein a first color of the plurality of colors indicates minimal risk, wherein a second color of the plurality of colors indicates a moderate risk, and a third color of the plurality of colors indicates a high risk, wherein the risk is with respect to a hazard.

19. The system of claim 15, wherein the projected path circuit is configured to generate the projected path vector based on an aircraft performance parameter.

20. The system of claim 19, wherein the projected path circuit is configured to dynamically change the generated projected path vector based on at least one of an environmental condition and the aircraft performance parameter.

* * * * *